3,741,876
METHOD OF MEASURING ENZYME REACTION RATES
George G. Guilbault, New Orleans, La., Robert G. Sanders, Spencer, Mass., and Robert L. Zimmerman, Jr., New Orleans, La., assignors to Mason Research Institute Inc., Worcester, Mass.
Filed Aug. 6, 1970, Ser. No. 61,584
Int. Cl. C12k 1/04
U.S. Cl. 195—103.5 R                        29 Claims

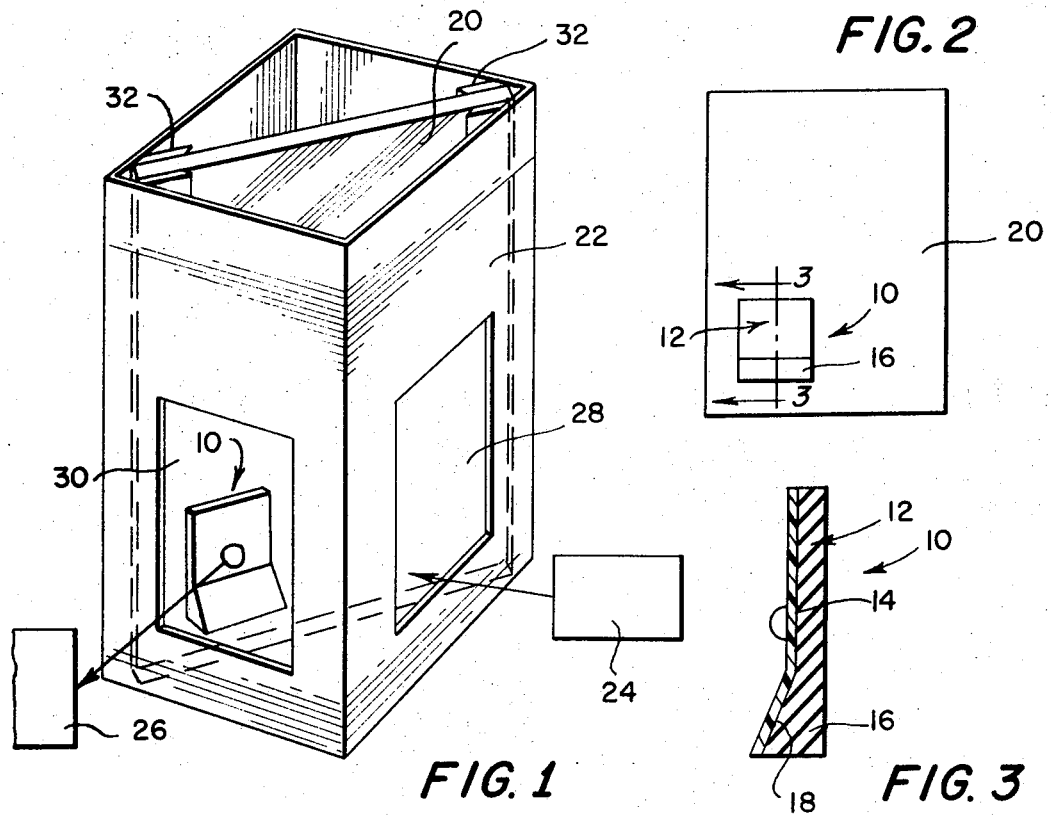
FIG. 2
FIG. 1
FIG. 3
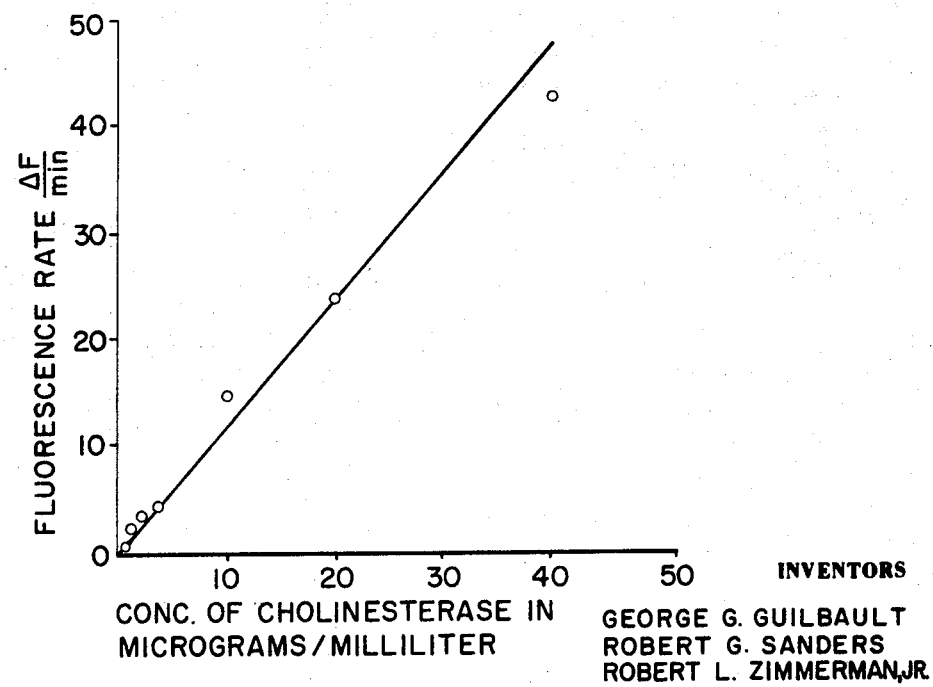
FIG. 4
INVENTORS
GEORGE G. GUILBAULT
ROBERT G. SANDERS
ROBERT L. ZIMMERMAN, JR.
Finnegan, Henderson & Farabow
ATTORNEYS

ABSTRACT OF THE DISCLOSURE

A reaction rate between an enzyme reactant and a substrate reactant is fluorometrically measured by forming a solid reactant film of one of the reactants on a silicone matrix pad. The reactant film is then contacted with a solution of the other reactant to produce a fluorescent material. The change of fluorescence with time is measured by placing the pad in a fluorometer and this rate of change is compared against a calibration curve to determine the concentration of the reactant in the reactant solution.

---

This invention relates to a method of measuring enzyme activity between an enzyme and a substrate, and more particularly to a solid surface fluorescence fluorometric method for measuring enzyme activity Enzymes are biological catalysts which enable the many complex chemical reactions, necessary to the existence of life, to take place at ordinary temperatures. Because enzymes work in complex living systems, one of their outstanding properties is specificity. Thus, an enzyme is capable of catalyzing a particular reaction of a particular "substrate" to produce a characteristic and measurable reaction end product. This specificity of enzymes and their ability to catalyze reactions of substrates at extremely low concentrations is of significant use in biochemical analyses.

Enzyme catalyzed reactions have long been used for such analytical purposes as determining the presence of specific substrates, enzyme activators, enzyme inhibitors, and enzymes themselves, and in determining the concentration of these substances. Numerous methods have been described in the prior art for the determination of enzymic activity between an enzyme and a substrate. Until recently, however, the disadvantages associated with the use of enzymes in these analytical techniques have seriously limited their usefulness.

The concentration of substrate material participating in an enzyme reaction can be calculated in one of two general ways. The first method measures, by chemical, physical or enzymatic analysis, the total change that occurs either in the end product or in the unreacted starting material. In this method, large amounts of enzyme and small amounts of substrate are used to insure a complete reaction. In the second method, which is a kinetic method, the initial rate of reaction is measured, in one of many conventional ways, by following the production of product or the disappearance of the substrate. In this method, the rate of reaction is a function of the concentration of substrate, enzyme, inhibitor and activator.

On the other hand, because enzymes are catalysts, and as such affect the rate and not the equilibrium of reactions, their concentration and activity must be measured by the rate or kinetic method. Similarly, activators and inhibitors that affect the enzyme's catalytic effect can be measured only by the rate method. While, as pointed out above, the substrate can be measured either by a total change or a rate method, the latter method is faster because the initial reaction can be measured without waiting for equilibrium to be established. The accuracy and precision of both methods are comparable.

In the past, manometric methods, pH procedures, and spectrophotometry have been used for determining enzyme activity. Spectrophotometry has been generally preferred because of its simplicity, its rapidity and the capability of measuring lower enzyme and substrate concentration. Spectrophotometry embraces the use of colorimetric methods where colored products are produced as a result of enzyme activity, and fluorescent methods where fluorescent compounds are produced as a result of enzyme activity. Fluorescent procedures are several orders of magnitude more sensitive than colorimetric methods and thus have replaced the colorimetric methods in numerous instances.

Previous fluorometric methods, although they have been improvements over other prior art methods of determining enzyme activity, have not eliminated all of the problems associated with enzymic analyses. Fluorometric analysis depends on the production of fluorescent compound as a result of enzyme activity between a substrate and enzyme. The rate of production of the fluorescent compound is related to both the enzyme concentration and substrate concentration. This rate can be quantitatively measured by exciting the fluorescent compound as it is produced and by recording the quantity of fluorescence emitted per unit of time with a fluorometer.

The prior methods for fluorometrically measuring enzyme reaction rates, however, are wet chemical methods and rely on reacting a substrate solution with an enzyme solution. The two most commonly used wet chemical methods are fluorometric end point methods and continuous reaction rate monitoring methods. Wet chemical methods, however, involve time consuming and wasteful preparation of costly substrate solutions and enzyme solutions. For example, in a standard continuous reaction rate monitoring method for determining the presence and concentration of an enzyme, a substantial amount of substrate must be accurately weighed out gravimetrically and dissolved in a large amount of buffer solution—usually at least about 100 ml.—to prepare a stock solution. The enzyme reaction is then usually carried out by measuring, for example, 3 ml. of stock substrate solution into an optical cuvet, adding a measured amount of the enzyme solution to the substrate solution, and recording the change in fluorescence emanating from the resultant solution per minute with a fluorometer. This standard wet chemical method is costly and wasteful because laboratory trained technician's time and relatively large quantities of expensive substrate are required.

Fluorometric end-point methods involve reacting an enzyme solution with a substrate solution and allowing sufficient time to elapse to enable the reaction to proceed to its equilibrium point. The total quantity of fluorescent end product formed during the reaction is determined by a fluorometer. This method is limited in application, however, because of the length of time that must elapse before a measurement can be taken.

Accordingly, it is a primary object of this invention to provide a fluorescent assay procedure and device for measuring enzymic reactions which is simple, rapid, inexpensive, and accurate.

Another object of this invention is to provide a fluorescent assay procedure which can be used to monitor practically any enzyme reaction.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve the foregoing objects and in accordance with its purpose, this invention provides a fluorometric method for measuring enzyme activity between an enzyme reactant and a substrate reactant. This method, as embodied and broadly described, comprises forming a solid reactant film of one of the reactants on an inert silicone matrix pad, contacting the film of the first reactant with a solution of the other or second reactant to produce a fluorescent material and measuring the change of fluorescence with time to determine the concentration of second reactant in the reactant solution.

Preferably, the reactant film is formed by dissolving the reactant in a solvent, depositing the reaction solution on the silicone pad so that the solution spreads evenly over the pad and solidifying the solution to form a film. The first reactant is preferably applied to the silicone pad in solution in acetone, buffer, water, or a polymerizable amide containing solution. The solution of the second reactant is preferably brought into contact with the reactant film in droplet form. Desirably, the silicone matrix pad is a silicone rubber elastomer.

In a further aspect of this invention a device is provided for use in a fluorometer to fluorometrically measure enzyme activity between an enzyme reactant and a substrate reactant. This device comprises a pad for placement in a fluorometer, the pad being formed from an inert silicone material and having a film of either the enzyme or substrate reactant on its top surface.

It is to be understood that both the foregoing general description and the following detailed description are exemplary and explanatory, but are not restrictive of the invention.

The accompanying drawings illustrate an example of the presently preferred embodiments of the invention and together with the description serve to explain the principles of the invention.

Of the drawings:

FIG. 1 is a perspective view of a silicone pad made in accordance with the teachings of this invention and mounted in a vertical position within a fluorescent cell.

FIG. 2 is a front elevation view showing a silicone pad made in accordance with the teachings of this invention mounted on a slide made of a rigid material.

FIG. 3 is a vertical section taken along line 3—3 of FIG. 2 and showing one configuration of a silicone pad made in accordance with the teachings of this invention.

FIG. 4 is a calibration curve showing the change of fluorescence with time versus the concentration of cholinesterase in a cholinesterase N-methyl-indoxyl acetate system tested in accordance with the present invention.

Figure 5:
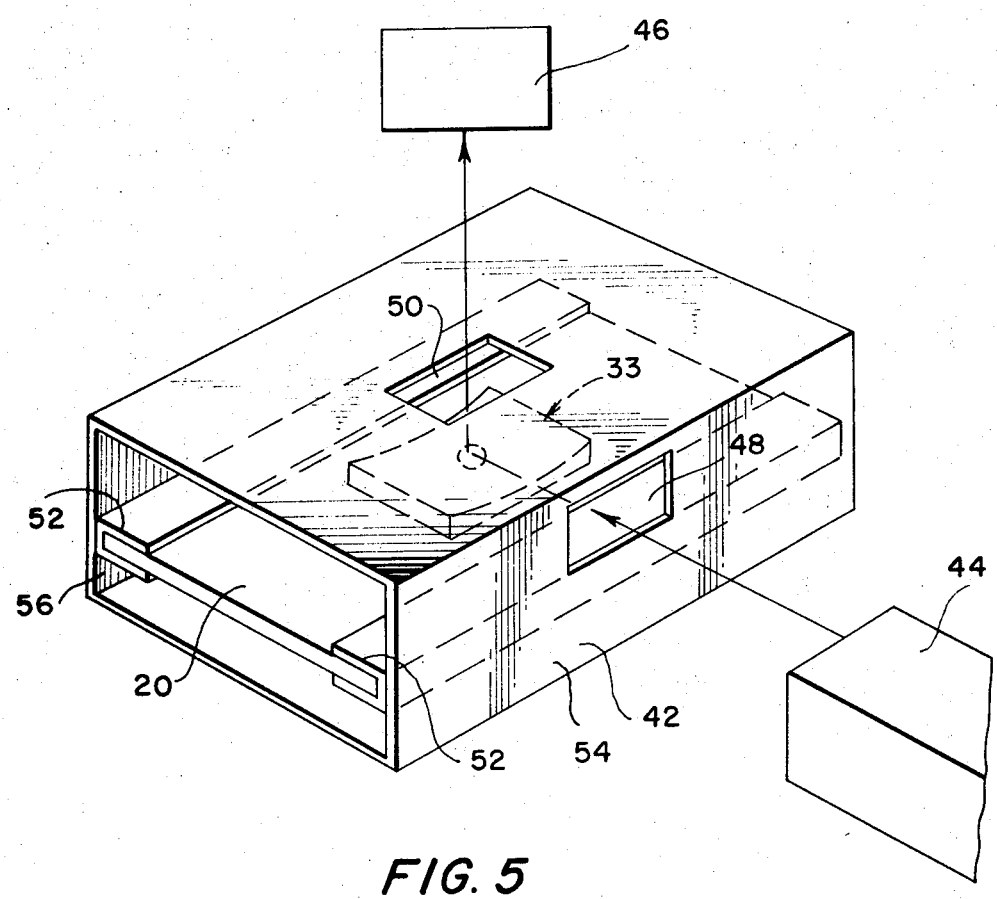
FIG. 5 is a perspective view of an alternate embodiment of a silicone pad made in accordance with the teachings of this invention and mounted in a horizontal position within a fluorescent cell.

In accordance with this invention, the fluorometric process for determining enzymic reactions between an enzyme reactant and a substrate reactant comprises as a first step forming a solid reactant film of one of the reactants on an inert silicone matrix pad.

As here embodied, the matrix that is used is an inert silicone material which when placed in a fluorometer produces a minimum amount of background noise or fluoroescence. In the present invention the reaction rate of an enzymic reaction is measured directly off the surface of the silicone pad by continuously monitoring the formation of a fluorescent end product from zero time to about 90 seconds.

At zero time and shortly thereafter, the amount of fluorescent end product present is relatively small, and accordingly a relatively small amount of fluorescence is emitted. To obtain accurate measurements of the fluorescence emitted it is necessary to provide a system which contains no significant or variable background noise or fluorescence. Any such noise can destroy the integrity of the measurements taken.

Various materials have been tested to obtain suitable matrix materials for use in the present invention, but to date, the only materials found effective in eliminating problems caused by background fluorescence are the silicones. Thus, various paper materials and polyurethane materials have been found to be unsatisfactory for use in the present invention due to excessive and variable background fluorescence. In addition to causing excessive background noise, these other materials have proved unsatisfactory because of their physical properties and their unstabilizing effect on the reactant films. For example, the poor stability of reactant substrate films on polyurethane have made it totally unsuitable for use in the present invention. Similarly, polyacrylamide gels have proved too soft, sticky and porous for use as a suitable matrix material in the pad of the present invention.

The physical properties of the silicones and the stability of the reactant films of enzyme and substrate in the presence of silicones further make these materials suited for use in the present invention. The silicone materials of this invention can retain a reactant film on their surfaces for an indefinite time, and permit direct measurement of fluorescence from its surface when an appropriate second reactant solution is dropped onto the first reactant film. Background interference due to light scattering and non-specific fluorescence are minimal compared to other materials.

Thus, one important aspect of the present invention is the discovery that the reactants that take part in an enzymic reaction can be placed on a silicone matrix in film form to provide a system that operates on fluorescent principles.

Suitable silicone materials which can be used in the present invention include both silicone rubbers and silicone resins. Silicone rubbers suitable for use in the present invention are well-known. Essentially, they are elastomers of high molecular weight of about 400,000 to 800,000 formed by slightly crosslinking linear diorganosiloxanes (preferably dimethylsiloxanes) and stopped by acyloxy, hydroxyl or oxime radicals. The crosslinking is usually the result of action by metal carboxylates and heat, if necessary, or moisture. These silicone rubbers are commonly referred to as "silicone elastomers" and are formed by the further polymerization of silicone gums.

Silicone elastomers, formed by further polymerizing the gums, can be characterized generally as the very sparsely crosslinked (cured) dimethyl polysiloxanes of high molecular weight. The sparsity of crosslinking is indicated by R/Si ratios very close to 2, generally above 1.95 or even above 1.99, and generally below 2.1 or even below 2.01, there usually being 200–500 dimethyl units between crosslink sites. In contrast, the much more densely crosslinked silicone resins which are considered commercially useful fall in the range of R/Si ratios of 1.2–1.5.

Representative silicone gums from which the silicone elastomers are prepared include the diorganopolysiloxanes having the central repeating linear

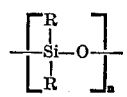

unit, where $n$ may be as small as or larger than 20,000, and where the R moieties in the chain may be the same, but need not be, each individual R being a monovalent alkyl, aryl, halogenated alkyl or aryl, or cyano-alkyl group, with not more than a few percent of total R being vinyl, phenyl, or halogenated vinyl or phenyl, the major proportion of R usually being methyl groups.

While an internal R may become a crosslinking site, depending somewhat on the curing mechanism, crosslinking more frequently involves the end groups which may be

or

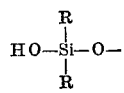

or

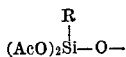

or

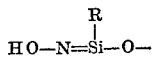

where R has the same meaning as above, and where Ac is a saturated aliphatic monoacyl radical.

The polymerizable silicone gums preferably are compounded with a catalyst to promote cure. The catalysts employed in the silicone rubber compositions include the organic carboxylic acid salts of tin, zinc, and other multivalent metals and are well known in the art. Available commercial silicone gum compounds generally provide, after curing, satisfactory silicone rubber pads to which the reactant films adhere for an indefinite time, without exhibiting any adverse effects such as instability; and provide good mechanical properties which minimize problems of wear in physical handling.

In addition to the catalyst, other conventional materials are often compounded with the silicone gums. For example, fillers such as the silica fillers can be employed to improve mechanical properties of the cured silicone rubber. It is not vitally necessary that the elastomer be filled. For example, silicone gum SE 76 (General Electric Company) reported to have an average molecular weight of 400,000–500,000, is an example of an unfilled silicone gum which, after curing to an elastomer, provides a satisfactory matrix pad for use in the present invention. Other specific silicone gums which, upon curing, provide good silicone rubber pads include General Electric's RTV–108, RTV–60 Potting Compound, RTV–118, S.S.–414, S.E.–30, S.E.–52, S.E.–76 and G.E. Clear Seal; and Dow Corning's Syloff 23, Syloff 236, and Silastic 432.

Still other silicone materials which can be used to form the pads of the present invention include the silicone rubbers produced from Dow Corning's Glass Ceramic Adhesive, a monomer which polymerizes in the presence of air to liberate acetic acid; Dow Corning's Adhesive Sealants 3140–RTV, 3141–RTV, 3144–RTV and 3145–RTV, monomers which polymerize in the presence of moisture (above 30% relative humidity) without liberation of acetic acid; and the silicone resin produced from Dow Corning's Silastic-C–RTV and Sylgard 185 Resin, a material polymerized with a catalyst which enables the user to more directly control the polymerization process.

In accordance with a preferred embodiment of this invention, the silicone rubber pads comprise a first section and at least one elevated projecting shelf attached to the first section for preventing reactant solution from running off the pad. As here embodied, and as best shown in FIG. 3, a pad, generally 10, has a first flat section, generally 12, having a top surface 14; and a projecting second section 16 having a flat top surface 18 which forms an obtuse angle with top surface 14 of first section 12. Second section 16 thus forms a projecting shelf for preventing reactant solution from running off the pad. This pad is particularly useful when it is desired to mount a pad in a vertical position in a fluorescent cell.

Figure 6:
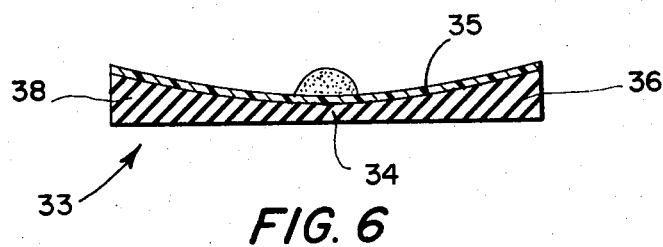
FIG. 6 is a vertical section through the silicone pad of FIG. 5 and showing a preferred configuration of a silicone pad made in accordance with the teachings of the present invention.

In accordance with a further embodiment of the silicone pad, and as best shown in FIGS. 5 and 6, a silicone pad, generally 33, is provided with an arcuate center section 34 having concave top surface 35, and two end projecting shelves 36 and 38 which are attached to either end of center section 34. This pad is particularly useful when it is desired to mount a pad in a horizontal position in a fluorescent cell. End shelves 36 and 38 prevent reactant solution from running off of the pad when the pad is mounted in a horizontal position since the reactant solution is "cradled" by the shelves.

The silicone pads useful in this invention can be prepared by pressing uncured silicone rubber material between pieces of Powder Paper (Eli Lilly and Company) into the desired shape, for example the shape shown in FIG. 2. Preferably, the pads shown in FIG. 2 are formed with a height of eight (8) mm., a width of five (5) mm., a thickness of one (1) mm. through fire section 12 and a thickness of approximately three (3) mm. at the end of second section 16. The dimensions of pad 33 shown in FIGS. 5 and 6 are substantially the same as the pad of FIG. 2. Pad 33 has a minimum thickness of one (1) mm. at center section 34 and a thickness of approximately three (3) mm. at the outer edges of shelves 36 and 38.

The pads are preferably prepared in a strip about 12 cm. long and 15 mm. wide. Pads are then cut into proper height and width with a razor blade. Usually 15 to 20 pads can be obtained from such a strip.

After a pad is formed, it is attached to a slide 20 by conventional means such as by applying an adhesive to the slide and overlying the pad on the adhesive. The slides that are used are made of a rigid material such as glass, plastic, or metal. Preferably, the slides are either conventional 3 x 1 in. glass microscope slides having a thickness of 0.96 to 1.06 mm. or 3 x 1 in. metal slides that are painted black. When pads having the configuration shown in FIGS. 2 and 3 are used and are to be in a vertical position within a fluorescent cell, they are placed approximately one (1) to two (2) cms. from the bottom of the slide with the second section 16 being nearest the bottom edge of fthe slide. When pads having the configuration shown in FIGS. 5 and 6 are used, and are to be in a horizontal position, the pad is placed in the center of the slide.

The slide and silicone pad assemblies here shown provide a convenient vehicle which can be easily produced, handled and worked with, and which can be easily placed in a fluorometer. As will be apparent to those of ordinary skill in the art, however, other assemblies incorporating the silicone rubber pad of this invention can also be satisfactorily used. For example, an assembly comprising a plastic slide having the silicone rubber pad imbedded within the slide at a proper location for insertion in a recording fluorometer can be used.

In accordance with the invention, after the silicone pad is placed on the slide, one of the reactants that takes part in the enzyme reaction is placed on the pad as a covering film. As here embodied, the reactant is applied to the silicone pad by forming a solution of the reactant in a solvent, depositing the solution on the pad so that the solution spreads evenly over the pad, and solidifying the solution to form a film. The reactant so deposited on the pad in film form can be either the substrate reactant or enzyme reactant.

When placing a film of enzyme reactant on the silicone pad, suitable solvents for forming the enzyme reactant solution are acetone, water, buffers, and polymerizable amide containing solutions. The preferred solvent for use with enzyme reactants is the polymerizable amide containing solution because it has been found to most readily effect uniform spreading of the enzyme solution over the entire surface of the silicone pad and does not effect a denaturation of the enzyme. Exemplary of suitable amide containing solutions for use in the present invention are those formed from acrylamide monomer, such as a mixture of acrylamide monomer with N,N'-methylene-bis-acrylamide. The solvent solution can be prepared by dissolving the acrylamide monomer and bisacrylamide in a buffer solution. This polymerizable amide solution can be polymerized by conventional means such as by photopolymerization and can have thereto added a catalyst to speed the polymerization. The polymerizable solution is stored in the dark at room temperature until ready for use and is preferably prepared fresh every two days.

Suitable buffer solutions that can be used as the solvent for the enzyme reactant include a phosphate buffer having a pH of 7.0 such as a 0.1 M sodium mono hydrogen phosphate buffer or 0.1 M sodium dihydrogen phosphate buffer; a tris buffer, such as a tris(hydroxymethyl)aminomethane buffer having a pH of 7.0; an acetate buffer; and the like.

After the enzyme is dissolved in the solvent, the resulting enzyme solution is placed on the top surface of the pad, and preferably uniformly covers the total surface area of the top surface. For example, when using a pad such as that shown in FIGS. 2 and 3, the enzyme solution is placed on top surfaces 14 and 16.

After the enzyme solution is placed on the pad, it is solidified into a film. When the enzyme solution is a polymerizable amide containing solution, solidification occurs by polymerizing the solution until an amide containing gel is formed. Polymerization can be achieved by irradiating the amide containing solution with a photoflood lamp for approximately fifteen minutes. When the enzyme reactant is contained within acetone, water, or buffers as the solvent, the solvent is evaporated from the solution by conventional means such as air evaporation to form a film of the enzyme reactant on the silicone pad.

When placing and drying an enzyme reactant on a silicone pad, it is preferred to form the silicone pad from silicone rubber elastomers which do not liberate acetic acid during their polymerization because enzymes are, in general, sensitive to acetic acid and therefore not as stable when acetic acid is present. The Dow Corning Adhesive Sealants are thus preferred when forming an enzyme reactant film.

When placing a reactant film of enzyme on the silicone, the enzyme reaction is produced by contacting the enzyme film with a reactant substrate solution. The concentration of reactant enzyme solution formed as a film on the silicone pad must exceed the concentration of the substrate solution to be measured so that the substrate concentration becomes the rate limiting factor. In practice, the exact enzyme concentration is not critical to the reaction rate as long as it is present in excess amounts. When working with excess enzyme concentrations the reaction rate becomes constant with enzyme concentration and does not depend on enzyme concentration.

Generally, at enzyme concentrations of 1 unit per ml., the reaction rate becomes independent of enzyme concentration while being proportional to relatively low concentrations of the substrate used, such as concentrations in the range of $10^{-7}$ M to $10^{-3}$ M. Since the concentrations of substrate materials desired to be measured usually are low concentrations, these samples are ideally suited for use in the present invention. Thus, the enzyme concentration applied to the silicone pads for measuring substrate concentrations in unknown samples is generally not critical, even over broad ranges of substrate concentrations. As understood in the art, and as used throughout this specification, a unit of enzyme is that amount of enzyme which causes one micromole of substrate to be hydrolyzed per minute at 25° C.

In forming a reactant enzyme film on a silicone surface it is only necessary to apply a small amount of enzyme solution to the pad to cover the top surface of the pad. When using a silicone pad having the dimensions and configuration of the pad shown in FIG. 3, the amount of enzyme solution that is dried on to the pad is preferably between 0.01 ml. and 0.05 ml., with the presently preferred amount being about 0.01 ml. The concentration of enzyme in the solution is preferably 1 unit per ml. and at this enzyme concentration, substrate concentrations of about $10^{-7}$ to $10^{-3}$ M can be effectively measured.

Suitable enzymes that can be applied in film form to the silicone pad in accordance with the present invention include cholinesterase, alkaline phosphatase, lipase, glucose oxidase, uricase, and the dehydrogenases, such as lactic acid dehydrogenase (LAD), glutamic acid dehydrogenase (GADH), alcohol dehydrogenase (ADH) and the like. Approximately one thousand enzymes are known and it is to be understood that virtually every one of these enzymes can be used in the present invention. Thus, the enzymes here listed are merely representative of the known enzymes that are useful in the present invention. Each enzyme is specific to a particular substrate and can thus be used to determine the presence and concentration of that substrate.

There are a number of enzymes, however, such as those generally characterized as dehydrogenases, which require the presence of coenzymes to produce the desired reaction between the enzyme reactant and substrate reactant. Thus, for example, to effect a reaction with the substrate lactic acid, the enzyme lactic acid dehydrogenase requires the presence of the coenzyme nicotinamide adenine dinucleotide (NAD) which is converted to a reduced form NADH during the reaction. When using an enzyme which requires the presence of a coenzyme to effect the catalytic reaction, the coenzyme is preferably incorporated in the enzyme reactant solution so that it is placed on the silicone pad in the same reactant film with the enzyme.

Generally, the dehydrogenases all require the presence of the coenzyme NAD to effect a catalytic reaction with a substrate. Fluorometric analysis of dehydrogenase systems using NAD has, in the past, been based on making NAD fluorescent. More recently, however, a simple technique of coupling the NADH to an electron acceptor in the presence of the enzyme diaphorase or the substance phenazine methyl sulfate (PMS) has been used to fluorometrically measure and determine these enzyme reactions.

In this coupling method, the non-fluorescent material resazurin is used in conjunction with the NAD-NADH system and during the enzymic reaction is converted to the highly fluorescent compound resorufin which can then be fluorometrically monitored. By using this coupling procedure, as little as $10^{-4}$ units per ml. of LDH can be quantitatively determined. This coupling technique is conveniently adapted to use in the present invention by incorporating the appropriate quantities of resazurin and either PMS or diaphorase in the enzyme reactant solution along with the coenzyme NAD and applying these substances to the silicone pad in a single film so that they are both present in the film when the substrate to be measured is applied to it.

When applying a film of substrate reactant to the silicone pad, some of the suitable solvents for forming a reactant solution containing the substrate are acetone, carbon tetrachloride, ethylene glycol monomethyl ether and dioxane. The preferred solvent for use in forming substrate films is acetone, because acetone has been found to most readily effect uniform spreading of the reactant over the entire surface of the silicone pad.

In applying substrate films, the silicone pad can be made of any of the silicone rubbers or silicone resins referred to above, since substrates, unlike enzymes, are not, in general, sensitive to the liberation of the acetic acid.

When forming a substrate film on a silicone pad the enzymic reaction is produced by contacting the substrate film with a reactant enzymic solution. The concentration of reactant substrate formed as a film on the pad must be in excess of the concentration of the enzyme solution to be measured, so that the enzyme concentration becomes the rate limiting factor. Again, the exact substrate concentration is not critical to the reaction rate as long as the substrate is present in excess amounts. When working with excess substrate, the reaction rate becomes constant with substrate concentration and does not depend on substrate concentration. Generally, at substrate concentrations of $10^{-2}$ M, the reaction rate becomes independent of substrate concentration while being proportional to relatively low concentrations of the enzyme used, such as concentrations in the range of $10^{-6}$ to $10^{-1}$ units per ml.

The samples of enzyme material desired to be measured contain very low concentrations of enzymes, on the order of $10^{-6}$ to $10^{-3}$ units per ml., and thus are ideally suited for use in the present invention.

Forming a reactant substrate film on a silicone matrix or pad surface requires application of only a small amount of substrate solution to the pad, to cover the top surface of the pad. When using a silicone pad having the configurations and dimensions shown in FIGS. 3 or 5, the amount of substrate solution dried on the pad is preferably between 0.010 ml. to 0.05 ml., with a presently preferred amount being 0.01 ml. The preferred substrate solution has a concentration of $10^{-2}$ M.

Suitable substrates for use in the present invention are selected for indicating the presence or determining the concentration of a particular enzyme. They include N-methyl-indoxyl acetate, resorufin butyrate and indoxyl acetate for use in determining the enzyme cholinesterase; naphthol - AS - BI - phosphate, umbelliferone phosphate, flavone phosphate, and fluoroscein phosphate for use in determining the presence of the enzyme alkaline phosphate; N-methyl-indoxyl myristate and fatty acid esters of 4-methylumbelliferone such as myristol-4-methylumbelliferone or heptanoyl-4-methylumbelliferone for determining the presence of the enzyme lipase; lactic acid for determining the enzyme LAD; glucose for determining the presence of the enzyme glucose oxidase; uric acid for determining the enzyme uricase; and the like.

The substrates listed are merely representative of the known substrates that are useful in the present invention. Many of these substrates are attacked by a number of different enzymes so the procedures described are not truly specific. Therefore, the identity of other enzymes present in the sample to be analyzed must be established.

When assaying for an enzyme which requires the presence of coenzymes to produce the desired reaction between the enzyme reactant and substrate reactant, the coenzyme can be incorporated into the reactant film when it is placed on the silicone pad. Thus, when forming a substrate film on the pad for determining the presence of dehydrogenases, the coenzyme NAD is incorporated in the substrate solution that is applied to the silicone pad to form a reactant substrate film containing within it the coenzyme NAD. Further, if desired, other reactants such as PMS and reazurin can be incorporated in the substrate film to make use of the coupling technique for fluorometrically determining enzyme reactions.

In accordance with this invention, the film of the first reactant is contacted with a solution of the other or second reactant to produce a fluorescent material. As here embodied, when an enzyme is the reactant applied to the silicone pad as a solid dried film, the reactant film is contacted with a substrate solution to produce an enzymic reaction between the enzyme and substrate. Before the reactant solution is applied to the reactant film, however, slide 20 containing the silicone pad coated with the reactant film is placed in a fluorometer to obtain a "blank" rate of fluorescence and determine the natural fluorescence of the system when no reaction is occurring.

After the blank reading is obtained, the substrate solution is preferably applied to the silicone pad in the form of a tiny droplet which when placed on the pad substantially retains its droplet form and does not spread over the entire surface of the pad. The droplet of substrate solution is preferably placed on the pad by using a disposable, calibrated, micropipette to correctly measure the amount of substrate placed on the pad.

To allow analyses of solutions containing unknown concentrations of substrate, it is first necessary to obtain standardized data, such as a calibration curve showing how the rate of fluorescence varies with known concentrations of substrate. In obtaining standardized data, like amounts of a number of different but known concentrations of substrate solution are applied under identical conditions to fresh silicone enzyme pads having identical properties and the rate of fluorescence produced at each concentration is then recorded. Once this data is obtained, unknown concentrations can be readily measured by placing the same standard amount of solution containing the unknown concentration on the pad.

Preferably, substrate-enzyme reactions are carried out by contacting equal amounts of substrate with enzyme and thus the amount of substrate solution added to the silicone pad for obtaining standardized data and for measuring unknown concentrations of substrate is equal to the amount of enzyme solution that has been applied to the silicone pad to form the enzyme film. The substrate solution placed on the enzyme film is preferably a buffered solution to maintain the pH of the solution at a desired value at which the enzymic reaction best proceeds.

When applying the substrate to the silicone pad, care must be taken to insure that the drop is deposited on the reactant film at the center of the pad or when using a pad such as shown in FIG. 3, at the center of first section 12. To obtain accurate and reproducible measurements, the same amount of substrate solution must always contact the same amount of enzyme film. By carefully placing the drop in the center of the pad, the same amounts of reactants will always be contacted. The use of a silicone pad is important to this aspect of the invention in that the silicone material aids in causing the drop to retain both its droplet size and shape so that the same amount of substrate solution always contacts the same amount of enzyme film.

Similarly, where the substrate reactant is formed on the silicone pad as a dry film, the enzyme solution is placed in droplet form on the pad to initiate the enzymic reaction between the substrate and enzyme so that the rate of the reaction can be determined to enable the cacuation of the concentration of the enzyme that is placed on the pad. The enzyme solution is preferably placed on the center of the pad in droplet form with the use of a disposable, calibrated, micropipette so that the same amount of enzyme solution always contacts the same amount of substrate film as a result of the droplet retaining both its droplet size and shape.

In accordance with the invention, the change of fluorescence with time is measured to determine the concentration of the reactant in the reactant solution.

As here embodied, and referring to FIG. 1, slide 20 containing the silicone pad and reactants is placed in a fluorescent cell 22 and the silicone pad is subjected to fluorescent excitation by an emitter 24. The fluorescence produced by exciting the fluorescent reaction end product is then measured by a detector 26.

As shown in FIG. 1, fluorescent cell 22 comprises a rectangular cell made of a suitable rigid material such as ordinary sheet metal, wood, or plastic and having a first opening 28 in one side to allow light to enter, and a second opening 30 in an immediately adjacent side to allow light to leave the cell. The top of cell 22 is provided with guides 32 at opposite corners so that glass slide 20 can be placed diagonally within the cell. In order to obtain as low a background as possible the cell is painted with a black optical paint that has a dull finish.

When placed within cell 22, slide 20 is positioned so that second section 16 of the silicone pad is toward the bottom of the cell, and top surfaces 14 and 18 of the pad are aligned with openings 28 and 30. The positioning of the pad in flourescent cell 22 with second section 16 at the bottom of the cell thus prevents the drop of reaction solution on the pad from running off, since second section 16 protrudes outwardly to serve as a barrier. The positioning of the pad in alignment with openings 28 and 30 permits light from emitter 24 to excite the fluorescent material on the pad and to be reemitted and detected by detector 26.

At zero time, slide 20 containing the reactants is placed in cell 22 and the change in fluorescence with time is automatically recorded on a linear recorder which is attached to detector 26. Preefrably, detector 26 and emitter 24 are components of an Aminco filter fluorometer to which is attached a Beckman 10" linear recorder for recording the change in fluorescence. The fluorescence measurements, as previously stated, are first taken to monitor the rate of change in fluorescence on known concentrations of reactants so that calibration data can be obtained. Once calibration data for a given system is obtained, the unknown concentration of samples can be obtained by measuring the rate of fluorescence produced by the sample.

In the embodiment where the pad has two elevated shelves, and as shown in FIG. 5, a slide 20 containing a silicone pad 33 and reactants is placed in a longitudinally extending fluorescent cell 42 which is rectangular in shape. Fluorescent cell 42 has a first opening 48 in one side which permits light from an emitter 44 to enter the cell, and a second opening 50 in its top which permits light to leave the cell where it can be measured by a detector 46 positioned above the cell. Opposite sides 54 and 56 of fluorescent cell 42 are provided with horizontally extending guides 52 so that slide 20 can be placed horizontally within the cell.

When placed within the cell, slide 20 is positioned so that pad 33 is aligned with openings 48 and 50, with the edge of concave surface 35 facing opening 48. It has been found that better precision and significantly less read-out background noise is obtained when the slide and pad are positioned in a horizontal position as shown in FIG. 5. The minimal amount of background interference obtained from use of a silicone rubber pad is thus further reduced when the pad is in a horizontal position. This further reduction in background noise is believed to occur because the detector only "sees" the fluorescent emission in the tiny droplet that is placed on the pad, and is, therefore, not affected by light absorption and scattering at the surface interface of the droplet and pad that occurs when the pad is positioned in a vertical direction.

In accordance with one embodiment of this invention, enzyme inhibitors or activators are detected by contacting a solution of inhibitor with an enzyme reactant, and measuring the fluorescent activity of the enzyme when contacted with a substrate. Enzymes are specifically and instantly inhibited, or in some cases activated by submicrogram quantities of toxic chemical compounds. If these compounds are present in a reactant system, the fluorescence produced by known concentrations of substrate and enzyme will be different than that expected from such concentrations.

For example, cholinesterase is inhibited by organophosphorous and carbamates classes of pesticides. By comparing the fluorescence produced in the reaction of this invention, it is also possible to detect nanogram quantities of such pesticides as parathion, paroxan, and dimethyldichlorovinyl phosphate (DDVP) when these pesticides appear in air or in water. Therefore, the pad of this invention can be used to detect monitor and warn for the presence of these types of pesticides in water and air. Alkaline phosphatase is inhibited by trace quantities of beryllium and mercury and hence can be used as a pollution monitor for these toxic metals. Many other examples can be cited where enzymes can be used to detect toxic micropollutants in air, water, food, soil, and the like.

The possible applications of the present invention are very broad in the biochemical laboratory, in clinical medicine and in the pollution detection fields, and for that matter wherever enzyme or substrate assessments are to be made. The method of the present invention is applicable to essentially all enzyme and substrate assessments.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

In this example a calibration curve for determining the concentration of cholinesterase is prepared based on the cholinesterase-N-methyl-indoxyl acetate system. A number of solutions containing known concentrations of horse serum cholinesterase and varying in concentration from 50 gamma per milliliter to 1 mg. per milliliter are prepared usig a 0.1 M phosphate buffer having a pH of 7.0 as the solvent.

A number of silicone rubber pads are made by further polymerization of a silicone gum sold under the trade designation Dow Corning Adhesive Sealant 3140–RTV at room temperature for one minute in the presence of air. The silicone gum is first molded into the configuration shown in FIG. 3, and then polymerized to form the pad. Each pad is molded to an identical size. Each silicone pad is then placed on a glass slide approximately one (1) cm. from the bottom of the slide. A substrate reactant solution containing $10^{-2}$ M concentration of N-methyl-indoxyl acetate in acetone is prepared by the methods described by Guilbault et al., Analytical Letters 1:365–379, 1968. A 0.020 ml. drop of this solution is applied to the center of each pad using a disposable calibrated micropipette to accurately measure the amount placed on the pad. The acetone in the solution is allowed to evaporate and a film of the N-methyl-indoxyl acetate is thereby formed on the pad.

Each pad is then placed in the fluorescent cell shown in FIG. 1 and a background flourescence reading is taken. After a background reading for a pad is obtained, 0.02 ml. of one of the known enzyme cholinesterase solutions is placed on the pad by using a clean, disposable micropipette. The enzyme solution is carefully placed on the center of the pad. The pad is then immediately placed in the flourescent cell and the rate of fluorescence for this concentration is recorded. The procedure is repeated until the rate of fluorescence of each known concentration is obtained. From this data a calibration plot of change in fluorescence per unit of time versus cholinesterase enzyme concentration is made. A calibration curve prepared by this method for the cholinesterase-N-methyl-indoxyl acetate system is shown in FIG. 4.

EXAMPLE 2

In this example the concentration of cholinesterase in a solution containing an unknown concentration of cholinesterase enzyme is determined. A silicone rubber pad product in the manner described in Example 1 is wetted with 0.020 ml. of the enzyme solution of unknown concentration from a micropipette. The pad is placed in a fluorescent cell and the rate of change in fluorescence with time is recorded. This rate is then compared with the calibration curve produced in Example 1 and the concentration of the unknown solution is thereby determined.

The precision and accuracy of this method of determining unknown solutions of cholinesterase was evaluated by preparing known solutions of cholinesterase and submitting these solutions to graduate students at Louisiana State University as unknown solutions. Each solution was assayed six (6) times by the method of this invention and the results tabulated. The accuracy of this method using cholinesterase was ±3% and the precision was ±5%.

EXAMPLE 3

In this example 0.01 ml. of 0.1 M phosphate buffer solution of pH 7.0 and containing a cholinesterase enzyme concentration of one (1) unit per ml. is applied to a silicone rubber pad made from the Dow Corning Adhesive Sealant 3140–RTV. The buffer solution is allowed to evaporate so that an enzyme film is formed on the pad. Solutions containing known concentrations of N-methyl-indoxyl acetate are prepared. A 0.01 ml. drop is taken from each acetate solution and applied to a fresh silicone pad containing an enzyme film. The pad is then placed in a fluorscent cell and the change of fluorescence with time is recorded for each known acetate solution. A calibration curve is prepared from this data showing the change of fluorescence with time versus the concentration of N-methyl-indoxyl acetate. This calibration curve is then used to assay unknown solutions for the concentration of N-methyl-indoxyl acetate.

EXAMPLE 4

In this example a calibration curve is prepared for assaying the enzyme alkaline phosphatase. Silicone rubber pads are prepared containing naphthol-AS-BI-phosphate in the reactant substrate film. The substrate film is formed on the pad by placing 0.010 ml. of an acetone solution containing $10^{-2}$ M concentration of naphthol-AS-BI-phosphate. Solutions containing known concentrations of alkaline phosphatase are prepared and 0.010 ml. of these solutions are placed on the pads using the techniques as described in Example 1 above. The change in fluorescence with time is measured for each known solution and a calibration curve is prepared from this data. Unknown concentrations of alkaline phosphatase ranging from $10^{-4}$ to 100 units per ml. can be determined from this data.

A 0.01 ml. drop of blood serum containing an unknown concentration of alkaline phosphatase is then added to a fresh pad. The pad is then placed in a fluorescent cell, the change in fluorescence is recorded, and the concentration of alkaline phosphatase is then determined from the calibration curve.

EXAMPLE 5

In this example a calibration curve is prepared for determining the enzyme lipase. Silicone rubbed pads are prepared and 4-methyl-umbelliferone myristate is applied to these pads as a reactant substrate film. The substrate film is formed on the pad by placing 0.01 ml. of an acetone solution containing a $10^{-2}$ M concentration of 4-methyl-umbelliferone myristate. Solutions containing known concentrations of lipase are prepared and 0.01 ml. from each of these solutions is placed on each of the pads using the techniques described in Example 1 above. The change in fluorescence with time is measured for each known solution and a calibration curve is prepared from this data. Unknown concentrations of lipase ranging from $10^{-4}$ to 100 units per ml. can thus be determined from this data.

EXAMPLE 6

In this example a calibration curve is prepared for assaying the substrate glucose by using the enzyme glucose oxidase as a reactant film on a silicone pad having the configuration shown in FIG. 6 and formed from a silicone gum which does not liberate acetic acid during polymerization, (Dow Corning Adhesive Sealant 3140–RTV). The enzyme film is formed on the pad by placing 0.01 ml. of polymerizable amide containing solution having a concentration of 0.1 units of gluoces oxidase per ml. on the center of the pad.

The polymerizable amide containing solution is prepared by dissolving 3.0 grams of acrylamide monomer and 0.58 grams of N,N$^1$-methylene-bisacrylamide in 25 mls. of a 0.1 M tris buffer having a pH of 7.0. To catalyze the polymerization reaction 2.7 mgs. of riboflavin and 2.7 mgs. potassium persulfate are added.

Also included in the polymerizable amide containing solution is the enzyme peroxidase having a concentration of 0.1 unit per ml. and the substance p-hydroxy phenyl acetic acid (P-OH-PAA) having a concentration of 1 mg. per ml. The reaction between glucose and glucose oxidase produces hydrogen peroxide. Hydrogen peroxide oxidizes P-OH-PAA in the presence of peroxidase and oxidized P-OH-PAA is a highly fluorescent material.

After the solution is prepared and placed on the pad, it is polymerized to a polyacrylamide gel by irradiating with a G.E. BBA photoflood lamp for about 15 minutes.

Solutions containing known concentrations of glucose are prepared and 0.01 ml. from each of these solutions are placed on the pad using the techniques described in Example 3 above. The change in fluorescence with time is measured for each known solution and a calibration curve is prepared from this data. Unknown concentrations of glucose ranging from $10^{-6}$ to $10^{-2}$ M can then be determined from this curve.

EXAMPLE 7

In this example, a calibration curve is prepared for determining the presence and concentration of the enzyme inhibitor parathion which inhibits the activty of the enzyme cholinesterase. A silicone pad having a substrate film of N-methyl-indoxyl acetate is prepared. The acetate is applied to the film from an acetone solution and is present in the solution at a concentration of $10^{-2}$ M. The film is formed from 0.01 ml. of acetone solution. Ten microliters (0.01 ml.) of an aqueous solution containing $10^{-6}$ M concentration of parathion are then placed on the pad in droplet form and ten microliters of a cholinesterase solution having a concentration of 1 unit per ml. is added to the drop of parathon solution. The pad is then placed in a fluorescent cell and the change of fluorescence with time is recorded. This procedure is repeated with other known concentrations of parathion on fresh pads and a calibration curve can then be prepared from this data. Unknown concentrations of parathion as low as ten (10) parts per billion can be detected in this manner.

EXAMPLE 8

In this example a calibration curve is prepared for assaying the substrate lactic acid by using the enzyme lactic acid dehydrogenase as a reactant film on a silicone pad. The enzyme film is formed by placing on the pad 0.01 ml. of a polymerizable amide containing solution having a concentration of 0.1 unit of lactic acid dehydrogenase per ml. and polymerizing the solution to a gel. The polymerizable amide containing solution is prepared and polymerized in the same manner as set forth in Example 6. Also included in the polymerizable solution is the coenzyme NAD in a concentration of $10^{-3}$ M. PMS in a concentration of $10^{-3}$ M and resazurin in a concentration of $10^{-4}$. Solutions containing known concentration of lactic acid are prepared and 0.01 ml. from each of these solutions is placed on the pad in droplet form. The change in fluorescence with time is measured for each known solution and a calibration curve is prepared from this data. Unknown concentrations of lactic acid ranging from $10^{-6}$ to $10^{-2}$ M can then be determined from this data.

The invention in its broader aspects is not limited to the specific details shown and described and departures may be made from such details without departing from the principles of the invention and without sacrificing its chief advantages.

What is claimed is:

1. A fluorometric process for measuring enzyme activity between an enzyme reactant and a substrate reactant, which comprises:

(a) forming a solid reactant film of one of the reactants on an inert silicone matrix pad which minimizes the amount of background noise, (b) contacting the film of the first reactant with a solution of the second reactant to produce a fluorescent material, and (c) measuring the change of fluorescence with time to determine the concentration of second reactant in the reactant solution.

2. The process of claim 1 wherein the reactant film is formed by applying a solution of the reactant in a solvent to the silicone pad, depositing the solution on the pad so that the solution spreads evenly over the pad, and solidifying the solution to form a film.

3. The process of claim 2 wherein said solvent is acetone, buffer, or water, and the solution is solidified into a film by evaporation of the solvent.

4. The process of claim 2 wherein said solvent is a polymerizable amide containing solution, and the solution is solidified into a film by polymerizing the solution to a gel.

5. The process of claim 4 wherein said polymerizable amide containing solution includes acrylamide monomer so that a polyacrylamide containing gel is formed.

6. The process of claim 1 wherein a droplet of the solution of the second reactant is contacted with the film of first reactant.

7. The process of claim 1 wherein the silicone matrix pad is made of a silicone rubber elastomer.

8. The process of claim 1 wherein the enzyme reactant is selected from the group consisting of dehydrogenases, oxidases, phosphatases, uricase, cholinesterase, and lipase.

9. The process of claim 1 wherein the reactant film contains a coenzyme for catalyzing the reaction between the enzyme reactant and substrate reactant.

10. The process of claim 1 wherein the reactant film is the substrate reactant.

11. The process of claim 1 wherein the reactant film is the enzyme reactant.

12. The process of claim 1 wherein equal amounts of reactant film and reactant solution are contacted.

13. The process of claim 1 wherein the enzyme reactant is cholinesterase and the substrate reactant is N-methyl indoxyl acetate.

14. The process of claim 1 wherein the enzyme reactant is alkaline phosphatase and the substrate reactant is napthol-AS-BI-phosphate.

15. The process of claim 1 wherein the enzyme reactant is lipase and the substrate reactant is 4-methyl umbelliferone myristate.

16. The process of claim 1 wherein the enzyme reactant is glucose oxidase, the substrate reactant is glucose, and the reactant film contains peroxidase and p-hydroxyphenyl acetic acid.

17. The process of claim 1 wherein the enzyme reactant is a dehydrogenase and the reactant film contains the coenzyme nicotinamide adenine dinucleotide.

18. The process of claim 17 wherein the reactant film also contains resazurin and phenazine methyl sulfate.

19. The process of claim 1 wherein the solution of second reactant contains an enzyme inhibitor.

20. The process of claim 1 including contacting a solution of inhibitor with an enzyme reactant, then contacting the enzyme reactant with the substrate reactant, and measuring the change in fluorescence with time to determine the presence of inhibitor.

21. The process according to claim 1 wherein standardized amounts of film of first reactant and solution of second reactant are contacted, and the concentration of second reactant in the reaction solution is determined by comparing the measured change of fluorescence with time to standardized data.

22. A device for use in a fluorometer to fluorometrically measure enzyme activity between an enzyme reactant and a substrate reactant comprising a pad for placement in a fluorometer, said pad formed from an inert silicone material which minimizes the amount of background noise and having a solid film of one of said reactants on its top surface.

23. The device of claim 21 wherein the silicone material is a silicone rubber elastomer.

24. The device of claim 21 wherein the pad comprises a first section and at least one projecting elevated shelf attached to the first section for preventing a reactant solution from running off the pad.

25. The device of claim 24 wherein the first section has a concave surface and two elevated shelves are attached to the first section.

26. The device of claim 22 wherein the film is the enzyme reactant.

27. The device of claim 22 wherein the film is the substrate reactant.

28. The device of claim 22 wherein said top surface has a concave section.

29. A fluorometric process for measuring enzyme activity between an enzyme reactant and a substrate reactant, which comprises:

(a) contacting a solid film of one of the reactants provided on an inert silicone matrix pad which minimizes the amount of background noise with a solution of the second reactant to produce a fluorescent material; and (b) measuring the change of fluorescence with time to determine the concentration of second reactant in the reactant solution.

References Cited
UNITED STATES PATENTS

| | | | |
|---|---|---|---|
| 3,509,026 | 4/1970 | Sanders | 195—103.5 R |
| 3,562,352 | 2/1971 | Nyilas | 117—161 ZA |
| 2,904,474 | 9/1959 | Forg | 195—103.5 R |
| 3,604,927 | 9/1971 | Hirschfeld | 250—71 R |
| 3,350,216 | 10/1967 | McVannel et al. | 117—138.8 B |

A. LOUIS MONACELL, Primary Examiner

M. D. HENSLEY, Assistant Examiner

U.S. Cl. X.R.

117—138.8 A, 138.8 B; 250—71 R